(12) United States Patent
Cho

(10) Patent No.: US 7,046,906 B1
(45) Date of Patent: May 16, 2006

(54) LIGHT GUIDE PILLAR

(75) Inventor: Yu-Chi Cho, Taipei (TW)

(73) Assignee: Inventec Corporation, (TW)

( * ) Notice: Subject to any disclaimer, the term of this patent is extended or adjusted under 35 U.S.C. 154(b) by 0 days.

(21) Appl. No.: 11/038,108

(22) Filed: Jan. 21, 2005

(51) Int. Cl.
*G02B 6/10* (2006.01)

(52) U.S. Cl. ......................................... 385/146; 385/14

(58) Field of Classification Search ................ 385/146, 385/14
See application file for complete search history.

(56) References Cited

U.S. PATENT DOCUMENTS

| | | | | |
|---|---|---|---|---|
| 5,093,890 A | * | 3/1992 | Bregman et al. | ............ 385/146 |
| 5,462,700 A | * | 10/1995 | Beeson et al. | ............. 264/1.27 |
| 5,754,726 A | * | 5/1998 | Peterson et al. | ............ 385/147 |
| 5,995,690 A | * | 11/1999 | Kotz et al. | ...................... 385/25 |
| 6,115,184 A | * | 9/2000 | Hubble et al. | ............... 359/627 |
| 6,195,196 B1 | * | 2/2001 | Kimura et al. | ............... 359/295 |
| 6,320,182 B1 | * | 11/2001 | Hubble et al. | ............... 250/216 |
| 6,363,096 B1 | * | 3/2002 | Dodabalapur et al. | ......... 372/75 |
| 6,574,414 B1 | * | 6/2003 | Schechtel et al. | ........... 385/146 |
| 6,636,355 B1 | * | 10/2003 | Moshrefzadeh et al. | .... 359/460 |
| 6,667,786 B1 | * | 12/2003 | Van de Ven et al. | ......... 349/95 |
| 6,860,627 B1 | * | 3/2005 | Hsieh | ......................... 362/551 |

* cited by examiner

*Primary Examiner*—Ellen E. Kim
(74) *Attorney, Agent, or Firm*—Bacon & Thomas PLLC

(57) ABSTRACT

The present invention is to provide a light guide pillar disposed on a circuit board of an electronic apparatus having a light emitting element disposed thereon, where the light guide pillar includes a bulk opaque and disposed on the circuit board for covering the light emitting element and a pillar with one end inserted into the bulk while the other end thereof extended outside of the electronic apparatus, enabling the light source generated from the light emitting element to be guided and displayed outside of the electronic apparatus via the light guide pillar and enabling the bulk to stop the light source emitted from the light emitting element from dispersing. Therefore, the light source can be guided to outside of the electronic apparatus without interference.

3 Claims, 2 Drawing Sheets

LIGHT GUIDE PILLAR

FIELD OF THE INVENTION

The present invention relates to a light guide pillar, more particularly to a light guide pillar being disposed in an electronic apparatus for stopping the light source emitted from the light emitting element from dispersing and guiding the light source to outside of the electronic apparatus without interference.

BACKGROUND OF THE INVENTION

A light emitting diode (LED) is normally a light emitting PN junction diode composed of III-V or II-VI semiconductor compounds, such as GaAs, GaP, $Al_xGa_{1-x}As$, ZnSe, etc. When a forward bias is applied to the LED, the electrons in the N-type semiconductor combines with the holes in the P-type semiconductor. Since the electrons transition to a lower energy level, the superfluous energy is converted to photons, thereby emitting light. Since the electrons and the holes are continuously provided to the N-type and the P-type semiconductors from the current of the power source, the light emission process due to the electron-hole pair recombination persists, and the LED generates light continuously. For this reason, in contrast to a conventional light bulb, which generates light from thermal energy, the basic principle of light emission from the LED is due to the energy level transition of electrons. Therefore, the LED is a cold light emitting device, which is advantageous in that the LED generates less heat and consumes less power. In addition, the LED is more durable, faster in response, smaller in size and weight than the conventional light bulb.

In the range of visible light, the LED enters into many different marketplaces, such as the consumer electronic products, the information technology products, the communication products, and the back light source, by replacing the conventional small white light bulb. Later, the development and commercialization of high luminescence products have further extended the application of LED to the brake light of vehicles and the outdoor display boards. In recent years, high luminescence white LED products made of InGaN material have proven their success, which will indubitably revolutionize the LED applications.

The LED as an indicator is often installed on the circuit board of any apparatus. The apparatus comprises a housing, wherein a light guide pillar is disposed between the surface of the housing and the LED indicator. Conventional light guide pillar comprises a base, and at least a light guide pillar disposed on the base extending outward. One end of the light guide pillars is connected to the LED, while the other end of the light guide pillars is connected to the panel of an electronic apparatus. The light emitted from the LED is displayed on the panel by guiding through the light guide pillar. Furthermore, a first fastening member is disposed on one side of the base extending outward, while a second fastening member is disposed on another side of the base extended inward to incorporate with the first fastening member. The first fastening member of a base is incorporated with the second fastening member of another base such that the two bases are connected together. In this manner, the user can combine a number of light guide pillars via the bases thereof according to the number of LED that is required.

However, regardless of whether the light guide pillars emit light in a single direction or in a multiple of directions, the user will experience inhomogeneous or leaking luminescence when looking at the light guide pillar, which renders the usage very inconvenient. In addition, different messages are often represented and indicated by different colors of LEDs. Since the separation between the LEDs is very close to each other, the emitted light often interferes with each other, resulting in color mixing. For this reason, it is difficult for users to clearly identify the message that the indicator is displaying when the indicator is displaying two or more colors at the same time. Some possible solutions are available in the art. Among them, one possible solution is to employ a light blocking rib to hinder the light transmission. However, the effect of this solution is not significant. Another solution is to increase the separation between LEDs to prevent light intervention. However, this solution requires the compliance of the circuit board and the appearance. Moreover, such light intervention still remains when the luminescence of the LEDs is too high. Therefore, the problems of the conventional light guide pillars are not yet solved.

SUMMARY OF THE INVENTION

In light of the above, a new light guide pillar has been developed and reduced to the subject matter of the present invention.

It is an object of the present invention to provide a light guide pillar. The light guide pillar is disposed on a circuit board of an electronic apparatus. The circuit board comprises a light emitting element disposed thereon. The light guide pillar includes a bulk and a pillar. The bulk is opaque and is disposed on the circuit board. The bulk covers the light emitting element disposed on the circuit board. One end of the pillar is inserted into the bulk, while the other end of the pillar is extended outside of the electronic apparatus. The light source generated from the light emitting element is thus guided and displayed outside of the electronic apparatus via the light guide pillar. In this manner, the bulk can stop the light source emitted from the light emitting element from dispersing. Therefore, the light source can be guided to outside of the electronic apparatus without interference.

The above and other objects, features and advantages of the present invention will become apparent from the following detailed description taken with the accompanying drawings.

DETAILED DESCRIPTION OF THE PREFERRED EMBODIMENTS

Figure 1:
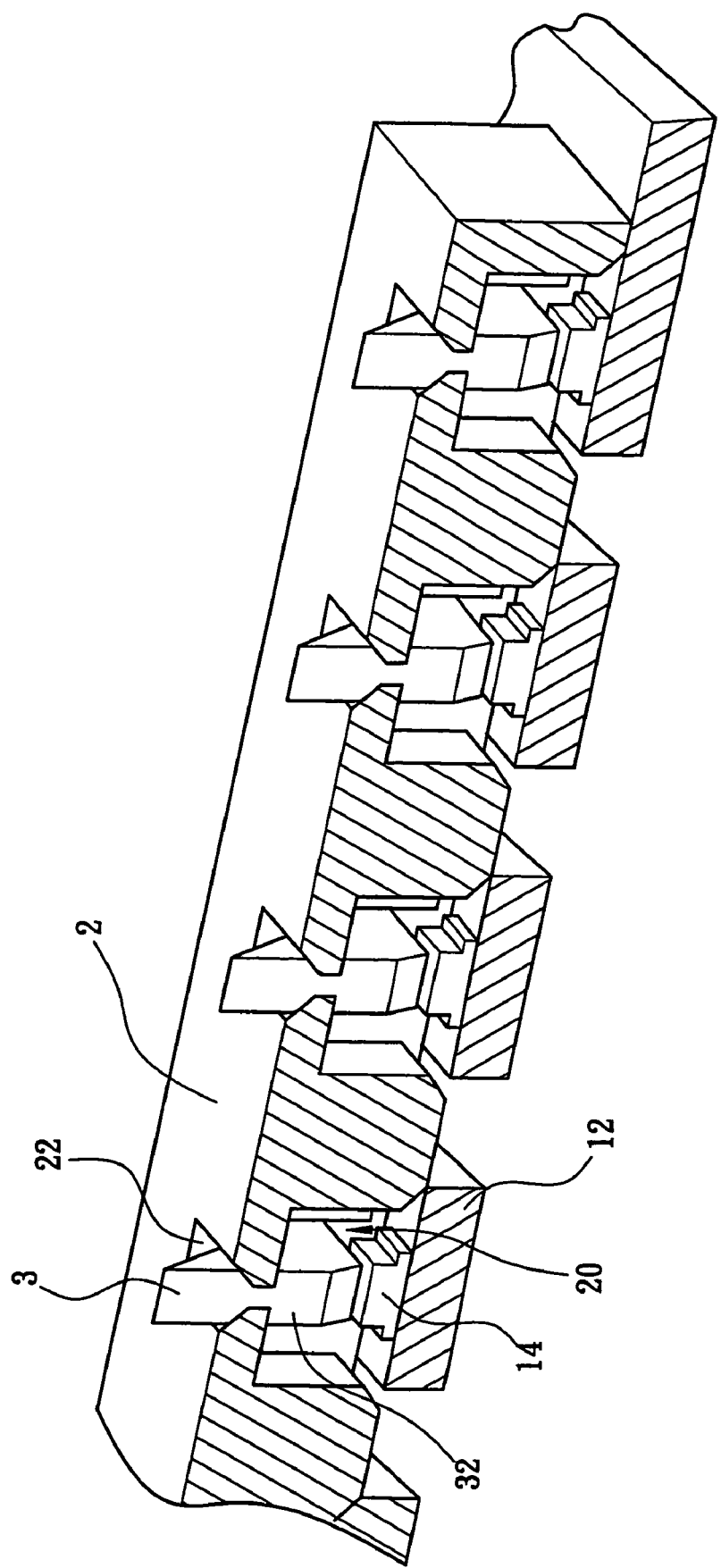
FIG. 1 illustrates a light guide pillar of the present invention being installed in an electronic apparatus.
Figure 2:
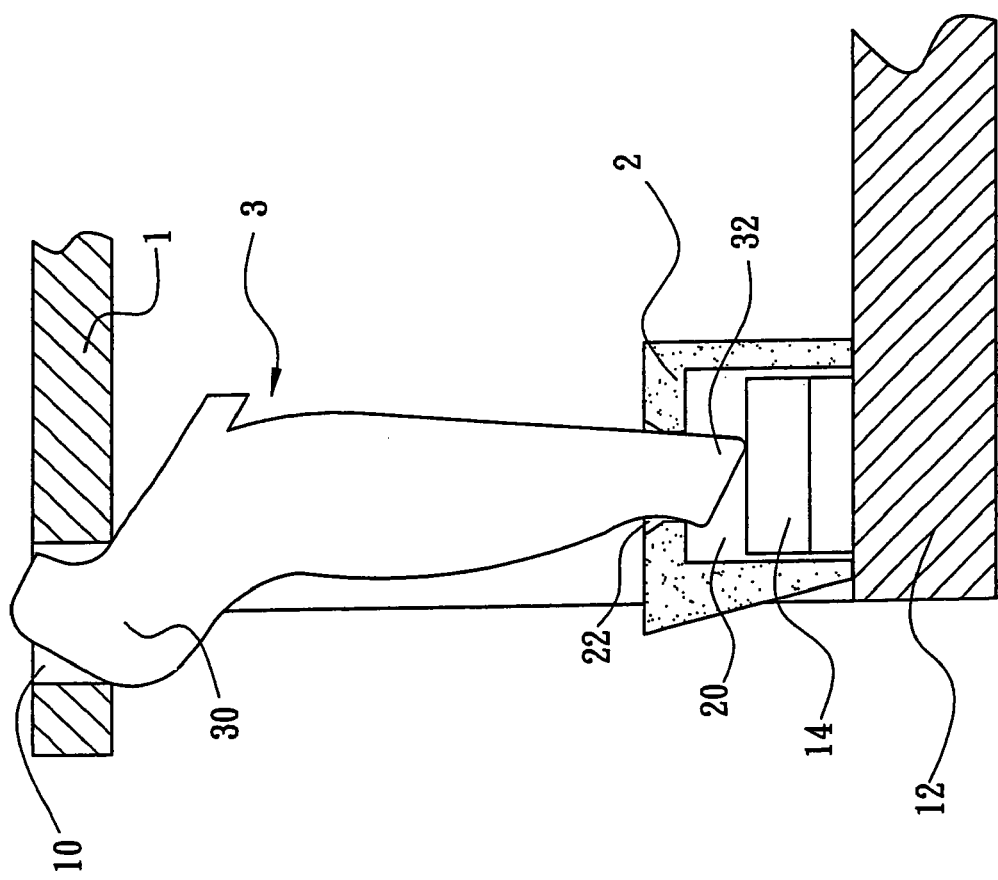
FIG. 2 is a sectional view illustrating the light guide pillar of the present invention.

Referring to FIG. 1 and FIG. 2, the light guide pillar of the present invention being installed on a circuit board 12 of an electronic apparatus are illustrated. The circuit board 12 comprises a light emitting element 14. The light emitted from the light emitting element 14 is directed outside of the electronic apparatus via the light guide pillar. The light guide pillar comprises an opaque bulk 2, which is disposed on the circuit board 12 of the electronic apparatus. The light emitting element 14 is just covered by the bulk 2. A pillar 3 is deposed on the bulk 2. One end of the pillar 3 is inserted in the bulk 2, while the other end of the pillar 3 is extended outside the housing 1 of the electronic apparatus. In this way, the bulk 2 can stop the light source emitted from the light emitting element 14 from dispersing. The light source is further guided outside of the housing 1. The light guide pillar of the present invention can easily prevent light source from dispersing and precisely guide the light source outside of the electronic apparatus.

Referring again to FIG. 1 and FIG. 2, in this particular embodiment, the bulk 2 comprises a concave groove 20 and an insertion hole 22. The concave groove 20 is formed on the bottom surface of the bulk 2 for placing the light emitting element 14 therein when disposing the bulk 2 on the circuit board 12. The light emitting element 14 and the bottom of the concave groove 20 maintain a gap therebetween. One end of the insertion hole 22 is formed at the bottom portion of the concave groove 20 corresponding to the position of the light emitting element 14, while the other end of the insertion hole 22 is formed on the top surface of the bulk 2. The insertion hole 22 provides one end of the pillar 3 to insert therein.

In this particular embodiment, an insertion portion 32 is formed on one end of the pillar 3 facing the insertion hole 22. The insertion portion 32 is substantially smaller than the pillar 3, whereby the insertion portion 32 and the insertion hole 22 are incorporated with each other. A portion of the pillar 3 is inserted into the bulk 2 keeping a gap between the insertion portion 32 and the top surface of the light emitting element 14. The other end of the pillar 3 forms a viewable region 30. The viewable region 30 is extended beyond a hole 10 formed on the housing 1. The light source is then guided to the viewable region 30 from the insertion portion 32, and clearly displayed on the electronic apparatus.

In this particular embodiment, the viewable region 30 has a surface texture or a surface blasting, thereby homogeneously emitting out light source from the viewable region 30.

While the invention has been described by means of specific embodiments, numerous modifications and variations could be made thereto by those skilled in the art without departing from the scope and spirit of the invention set forth in the claims.

What is claimed is:

1. A light guide pillar disposed on a circuit board of an electronic apparatus for guiding light source emitted from a light emitting element disposed on the circuit board to outside of the electronic apparatus, the light guide pillar comprising:
    a bulk that is opaque and is disposed on the circuit board, the bulk covering the light emitting element on the circuit board; and
    a pillar disposed on the bulk, one end of the pillar being inserted into the bulk, an other end of the pillar being extended outside of the electronic apparatus;
    wherein the bulk further comprises:
        a concave groove formed on the bottom surface of the bulk for containing therein the light emitting element on the circuit board, the top surface of the light emitting element and the bottom portion of the concave groove forming a gap therebetween;
        an insertion hole defined in the bulk, one end of the insertion hole being formed on the bottom portion of the concave groove corresponding to the position of the light emitting element, an other end of the insertion hole being formed on the top surface of the bulk, whereby the insertion hole is adapted to receive one end of the pillar inserted therein; and
    wherein the pillar further comprises:
        an insertion portion, which is formed on one end of the pillar, and is inserted in the bulk, the insertion portion being substantially smaller than the pillar, the insertion portion and the top surface of the light emitting element forming a gap therebetween; and
        a viewable region formed at an other end of the pillar, the viewable region being extended outside of a hole formed on the electronic apparatus.

2. The light guide pillar as recited in claim 1, wherein the viewable region comprises a surface texture.

3. The light guide pillar as recited in claim 1, wherein the viewable region comprises a surface blasting.

* * * * *